US008234310B2

(12) United States Patent
Pottenger

(10) Patent No.: US 8,234,310 B2
(45) Date of Patent: *Jul. 31, 2012

(54) SOCIAL NETWORKING ON A WEBSITE WITH TOPIC-BASED DATA SHARING

(76) Inventor: William M. Pottenger, Hellertown, PA (US)

(*) Notice: Subject to any disclaimer, the term of this patent is extended or adjusted under 35 U.S.C. 154(b) by 214 days.

This patent is subject to a terminal disclaimer.

(21) Appl. No.: 12/317,152

(22) Filed: Dec. 19, 2008

(65) Prior Publication Data

US 2009/0164475 A1 Jun. 25, 2009

Related U.S. Application Data

(60) Provisional application No. 61/008,399, filed on Dec. 20, 2007.

(51) Int. Cl.
*G06F 17/30* (2006.01)
(52) U.S. Cl. .......................................... 707/802; 709/225
(58) Field of Classification Search ............... 707/999.1, 707/802; 709/219, 229, 225
See application file for complete search history.

(56) References Cited

U.S. PATENT DOCUMENTS

| | | | |
|---|---|---|---|
| 6,901,398 B1 * | 5/2005 | Horvitz et al. ................. 709/207 |
| 7,016,908 B2 | 3/2006 | Kataoka et al. | |
| 7,117,437 B2 | 10/2006 | Chen et al. | |
| 7,174,382 B2 | 2/2007 | Ramanathan et al. | |
| 7,328,216 B2 * | 2/2008 | Hofmann et al. ...................... 1/1 |
| 7,337,181 B2 | 2/2008 | Horvitz | |
| 7,392,303 B2 | 6/2008 | Smith et al. | |
| 7,617,370 B2 * | 11/2009 | Jernigan et al. ............... 711/165 |
| 7,634,466 B2 * | 12/2009 | Rose et al. ............................ 1/1 |
| 7,664,742 B2 | 2/2010 | Pettovello | |
| 7,769,804 B2 | 8/2010 | Church et al. | |
| 2002/0069056 A1 * | 6/2002 | Nofsinger ..................... 704/235 |
| 2002/0078062 A1 | 6/2002 | Kataoka et al. | |
| 2003/0191828 A1 | 10/2003 | Ramanathan et al. | |
| 2003/0236861 A1 | 12/2003 | Johnson et al. | |
| 2004/0024848 A1 | 2/2004 | Smith et al. | |
| 2006/0282309 A1 | 12/2006 | Zhang et al. | |
| 2007/0168469 A1 | 7/2007 | Church et al. | |
| 2007/0211651 A1 | 9/2007 | Ahmed et al. | |
| 2008/0080393 A1 | 4/2008 | Kaler | |

(Continued)

OTHER PUBLICATIONS

"Vimeo" by Internet Archive WayBackMachine, dated from Jun. 2, 2007, pp. 1-6.*

(Continued)

*Primary Examiner* — Monica Pyo
(74) *Attorney, Agent, or Firm* — Beverly W. Lubit; Greenberg Traurig, LLP

(57) ABSTRACT

A method and system for constructing a social network using advanced content-based indexing, data and index sharing, and a peer-to-peer network in conjunction with a web site interface. The system uses indexing techniques to identify and share common interests among users of the network, and integrated peer-to-peer software facilitates data sharing based on these interests. Users who wish to join the social network download client software from the network's web site. When installed, the software indexes data on the user's local storage devices by considering possible high- and low-order links between data elements. The indexing software generates an index of user data that is partitioned into separate topic indexes. This index represents a cross-section of the user's interests. The user is then able to join various "friend" groups on the network, and to select by topic which portions of the index are shared with which friend groups.

20 Claims, 7 Drawing Sheets

High-Level Logical Diagram

U.S. PATENT DOCUMENTS

2009/0125637 A1* 5/2009 Matuszewski ............... 709/238
2009/0177728 A1 7/2009 Pottenger
2009/0177757 A1 7/2009 Pottenger

OTHER PUBLICATIONS

Office Action issued in connection with U.S. Appl. No. 12/317,134 mailed Jun. 28, 2011.
Official Action issued in connection with U.S. Appl. No. 12/317,134 mail Oct. 7, 2010.
Official Action issued in connection with U.S. Appl. No. 12/317,134 mail Apr. 13, 2010.
Official Action issued in connection with U.S. Appl. No. 12/317,153 mail Sep. 28, 2010.
Official Action issued in connection with U.S. Appl. No. 12/317,153 mail Mar. 15, 2011.
Taskar, B. et al, "Discriminative Probabilistic Models for Relational Data", In Proceedings of Uncertainty in Artificial Intelligence Conference UAI02, Edmonton, Canada, 2002.
Getoor, L. et al., "Link Mining: A Survey", SIGKDD Explorations. vol. 7, No. 2, 2005, pp. 3-12.
MacSkassy, S.A. et al., A Brief Survey of Machine Learning Methods for Classification in Networked Data and Application to Suspicion Scoring, Workshop on Statistical Network Analysis at 23rd International Conference on Machine Learning, Pittsburg. PA., 2006.
Angelova, R. et al., "Graph-based Text Classification: Learn From Your Neighbors", SIGIR '06, Aug. 2006, Seattle, USA. pp. 485-492.
Neville. J. et al, "Iterative Classification in Relational Data", In Proc. AAAI-2000 Workshop on Learing Statistical Models from Relational Data, 2000, pp. 42-49.
Taskar, B. et al., "Probabilistic Classification and Clustering in Relational Data", In Proc. 17th Internabonal Joint Conference on Artificial Intelligence, 2001, pp. 870-878, 2001.
Lu, Q. et al., "Link-based Classification", Proceedings of the Twentieth international conference on machine learning (ICML-2003), Washington D.C., 2003, pp. 496-503.
Neville, J. et al., "Dependency Networks for Relational Data", Proceedings of the Fourth IEEE international Conference on Data Mining (ICDM'04), Nov. 2004, pp. 170-177, Brighton, UK.
Rennie, J.D.M. et al., "Tackling the poor assumptions of naive bayes text classifiers", In Proceedings of the Twentieth International Conference on Machine Learning, 2003.
McCallum, A.K. et al., "A comparison of event models for naive bayes text classification", In Working Notes of the ICMLAAAI Workshop on Learning for Text Categorization, 1998.
Eyheramendy, S. et al., "On the naive Bayes model for text categorization" In Proceedings of AISTATS 2003, 9th International Workshop on Artificial Intelligence and Statistics, 2003.
Kontostathis, A. et al., "A Framework for Understanding LSI Performance", Information Processing & Management, vol. 42, No. 1, 2006, pp. 56-73.
Deerwester, S. et al., "Indexing by latent semantic analysis", Journal of the America Society for Information Science, vol. 41, No. 6, 1990. pp. 391-407.
Ganiz, M. et al., "Link Analysis of Higher-Order Paths in Supervised Learning Datasets", In the Proceedings of the Workshop on Link Analysis, Counterterrorism and Security, 2006 SIAM Conference on Data Mining. Bethesda, MD., Apr. 2006.
Ganiz., M. et al., "Detection of Interdomain Routhing Anomalies Based on Higher-Oder Path Analysis", Proceedings of the Sixth IEEE international Conference on Data Mining (ICDM'06), Dec. 2006, Hong Kong, China.
Edmonds, F. "Choosing the word most typical in context using a lexical co-occurrence network", In Proceedings of the Thirty-fifth Annual Meeting of the Assodation for Computational Linguistics, 1997, pp. 507-509.
Zhang, X. et al., "Level search schemes for information filtering and retrieval", Information Processing and Management, vol. 37. No. 2, 2000, pp. 313-334.
Schutze, H., "Automatic Word Sense Discrimination", Computational Linguistics, vol. 24, No. 1, 1998, pp. 97-124.
Xu, J. et al., "Corpus-Based Stemming Using Co-Occurrence of Word Variants", ACM Transactions on Information Systems, vol. 16, No. 1, 1998, pp. 61-81.
Uno, T., "An Output Linear Time Algorithms for Enumerating Chordless Cycles", 92nd SIGAL of Information Processing Society Japan, 2003, pp. 47-53.
Uno, T., "Algorithm for Enumerating All Perfect, Maximum and Maximal Matchings in Bipartite Graphs", Lecture Notes in Computer Science, vol. 1350. Proceedings of the 8th International Symposium on Algorithms and Computation, 1997, pp. 92-101, ISBN: 3-540-63890-3, Springer-Verlag, London, UK.
McCallum, A.K. et al., "Automating the construction of internet portals with machine learning", Information Retrieval, vol. 3, 2000, pp. 127-163.
Giles, C.L. et al., "CiteSeer: An automatic citation indexing system", ACM Digital Libraries 98, 1998, Third ACM Conference on Digital Libraries, Ed. Witten, I. et al., ACM Press, New York, pp. 89-98.
Sen, P. et al., "Link-based Classification", University of Maryland Technical Report, No. CS-TR-4858, Feb. 2007.
Sarawagi, S. et al., "Cross-Training: Learning Probabilistic Mappings Between Topics", SIGKDD '03, 2003, Washington. DC, USA.
Chakrabarti, S. et al., "Enhanced Hypertext Classifcation using Hyper-Links",In proceedings of ACM SIGMOD Conference, 1998, pp. 307-318.

\* cited by examiner

High-Level Logical Diagram

Software Stack Diagram

Layer Structure of System Components

Indexing Module Diagram

P2P Module Diagram

Flowchart of Indexing Operation

Example of extracting/enumerating higher-order paths from a co-occurrence graph

Cross-training Procedure

SOCIAL NETWORKING ON A WEBSITE WITH TOPIC-BASED DATA SHARING

CROSS-REFERENCE TO RELATED APPLICATIONS

This application claims the benefit of provisional patent application Ser. No. 61/008,399, filed Dec. 20, 2007 by the present inventor.

This disclosure is related to U.S. patent application Ser. No. 12/317,153, titled "System for Content-Based Peer-to-Peer Indexing of Data on a Networked Storage Device", filed on Dec. 19, 2008, and U.S. patent application Ser. No. 12/317, 134, titled "Peer-to-Peer Indexing-Based Marketplace," filed on Dec. 19, 2008, both of which are incorporated herein by reference in their entirety.

BACKGROUND

1. Field of the Invention

This application relates to the field of internet-based social networks and techniques for their implementation by means of advanced indexing and peer-to-peer technologies.

2. Prior Art

This invention improves on prior art for sharing data on social networking websites by means of user-end client software that includes higher-order indexing algorithms and a customized peer-to-peer network. These allow data to be shared between users on a topical basis that mimics human intuition, as well as removing the well-known 'upload barrier' by exchanging data in the background independently of the website's interface.

SUMMARY OF THE INVENTION

This patent describes the construction of a social network along with a web site and specialized software to be run by users of the social network.

"Social networking" websites currently enjoy a high degree of popularity. Patrons of these sites often use them to share current information about the music they listen to or movies they have seen, upload recent pictures they have taken, and other media-related tasks. However, the current website interface model is not ideal for these types of tasks, because of the "upload problem". The problem is that to share any substantial information about current experiences, users must manually locate a file on their computing device and then upload it to the website using a potentially slow connection. This results in an awkward and less personal form of sharing that is a poor model of real-world peer interactions. This method also strains unnecessarily the resources of the providers of the social networking site, as the site's servers must act as an intermediary for all data exchanges.

The invention remedies these deficiencies in prior art by means of software which can be run on a variety of client-side devices, and also integrates a peer-to-peer network and advanced data indexing techniques seamlessly with the website interface. The user experiences a web interface, but in the background a Peer-to-peer (P2P) client runs to ensure continuous availability of shared resources. Furthermore, advanced topic-based indexing is employed to make the sharing more intuitive. Users of the site can select topics they wish to share information on, and with which groups they wish to share which topics. The media on their device(s) is automatically categorized by topic, and the indexes shared with members of the allowed groups, so that updates and previews of media relating to the selected topics will be automatically transferred and available to all group members through the website interface.

BRIEF DESCRIPTION OF THE DRAWINGS

FIG. 3 indicates an embodiment of the internal structure of the indexing software module, and FIG. 4 indicates an embodiment of the internal structure of the Peer-to-Peer software Module.

DETAILED DESCRIPTION OF THE INVENTION

Preferred Embodiment

Figure 1:
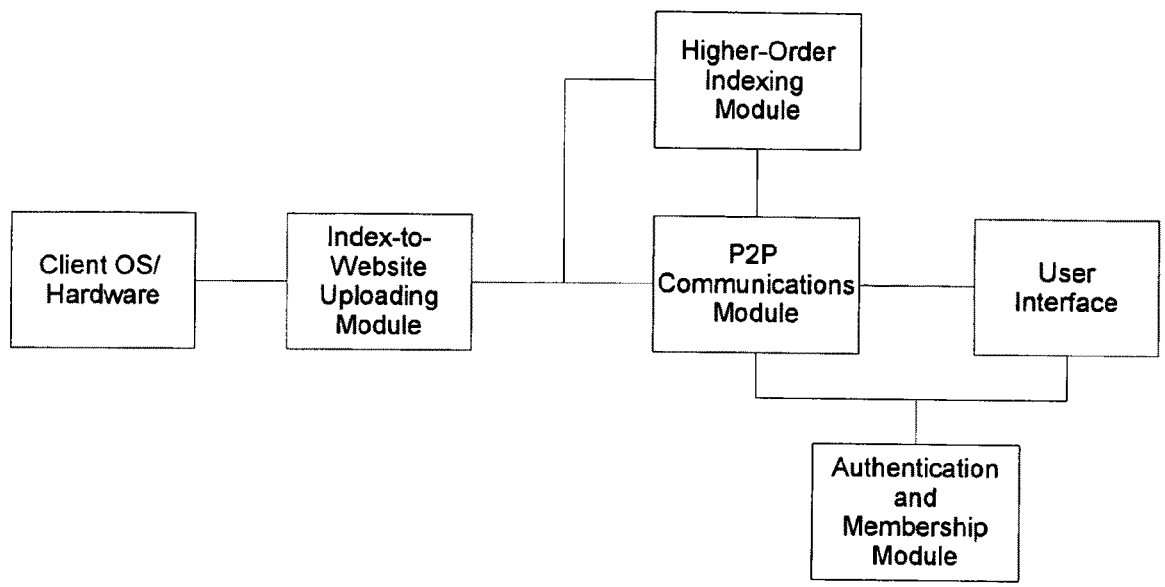
FIG. 1 is an embodiment of a high-level logical diagram depicting functional modules of the system.
Figure 2:
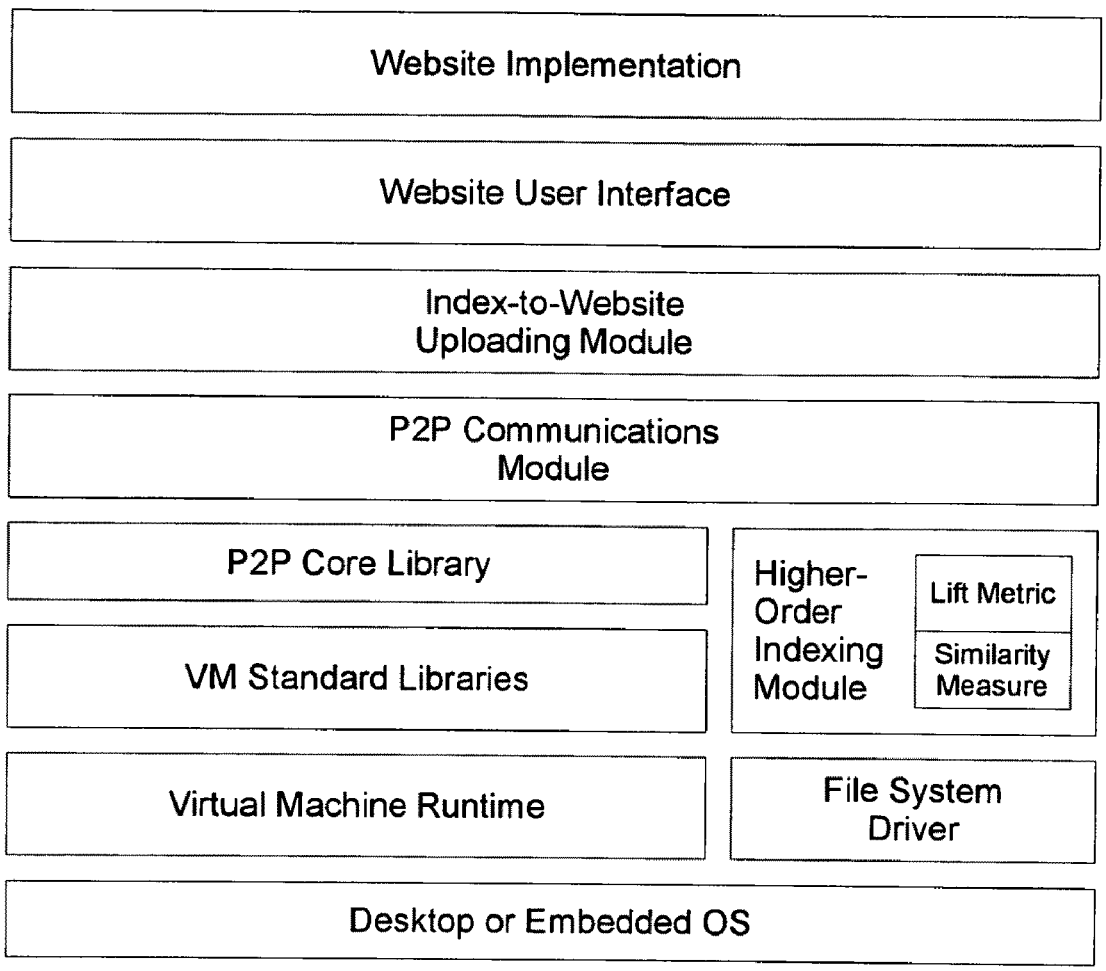
FIG. 2 is an embodiment of a vertically-oriented layer diagram showing a software stack employed by the system, from high- to low-level. This diagram provides an embodiment of the software modules used in the system, as well as interfaces between them. Vertical adjacencies in this diagram correspond to allowable interfaces between the software components in the description. Each of these interfaces is described below in the detailed description of the preferred embodiment.
Figure 3:
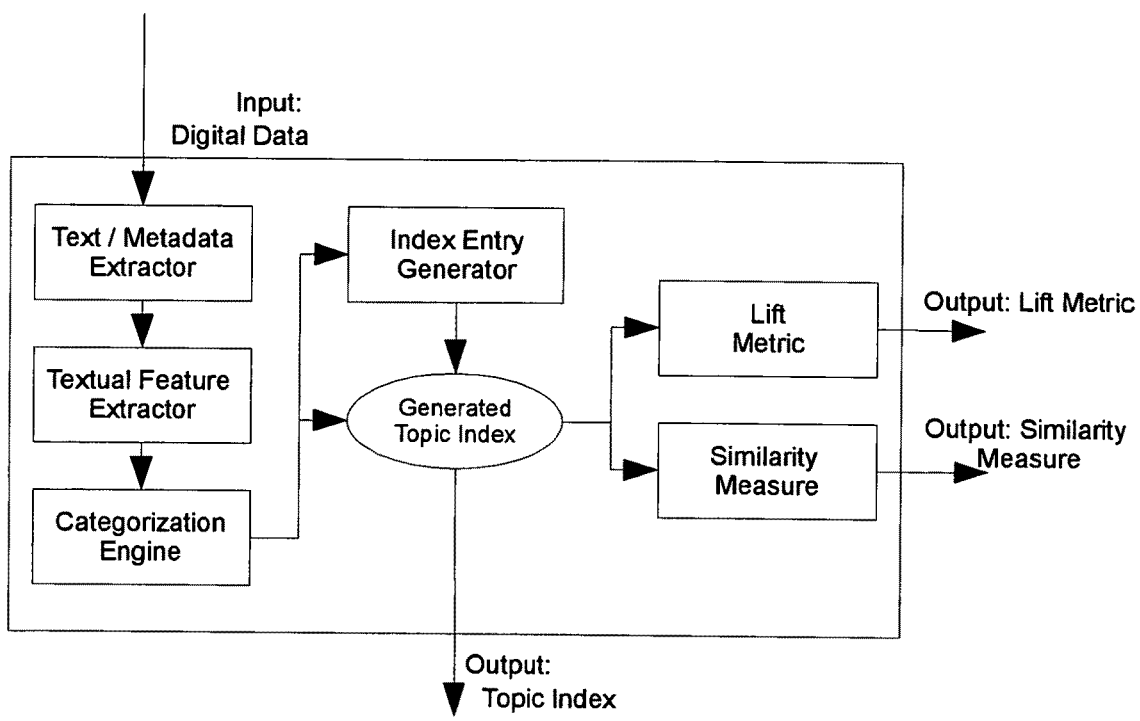
FIGS. 3 and 4 show further embodiments of software modules.
Figure 4:
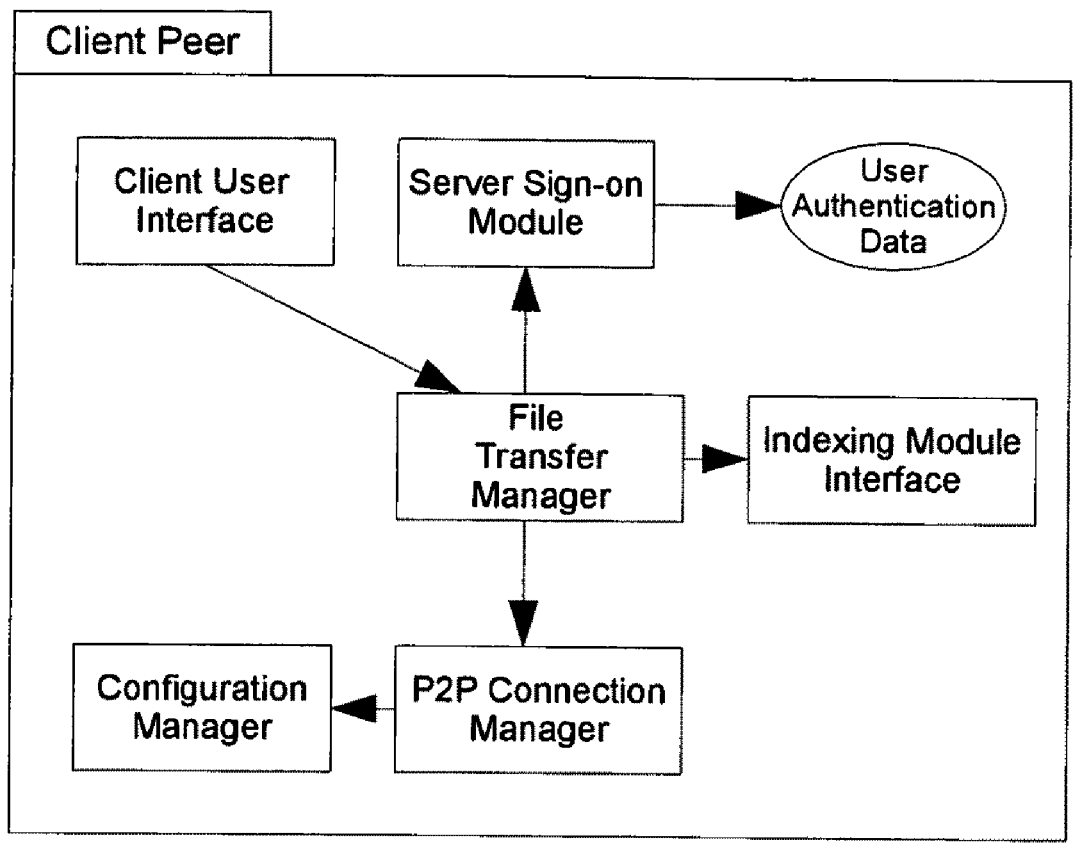
Figure 5:
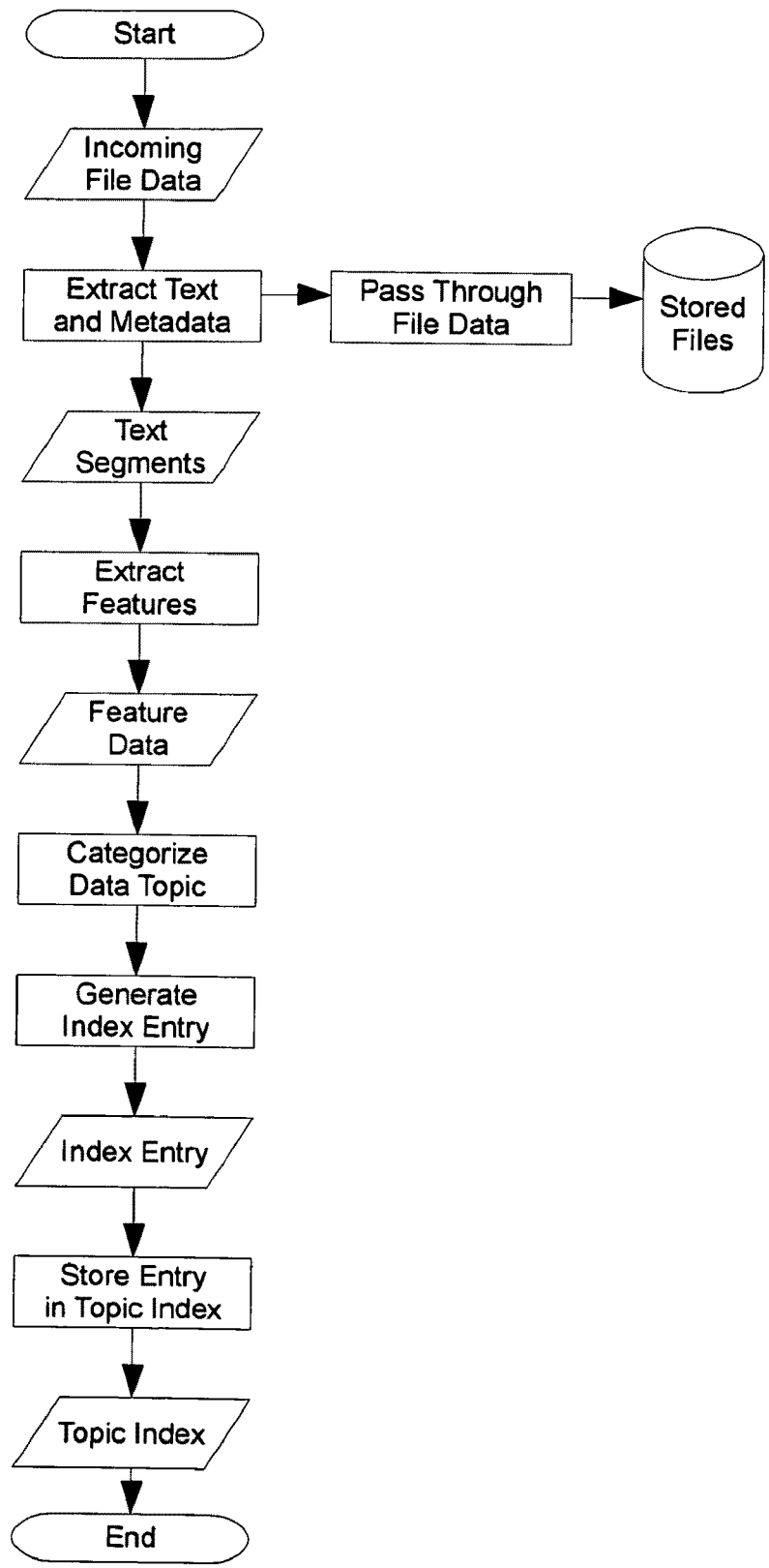
FIG. 5 is an embodiment of a flowchart showing the procedure for the operation of indexing new data.

Following is a description of all components of the invention and how they interoperate.

[001 Web Site User Interface]

The Website Graphical User Interface software is the primary means of operating the invention. Upon installation of the social networking client software, the network's web site provides the user with an interface allowing him or her to join various pre-existing groups, select friends within those groups, select which topic indexes are shared with which groups, to view the homepages of users within their groups and access their shared media, to search by topic or metadata on any peers to which the user has access, and to display updates made by friends to their topic indexes which are similar to the user's topic indexes. In the social networking application, the website user interface also acts as a medium for display of shared data, including photographs, videos, summary texts of movies, and sound files. Note that topic-based indexing allows users fine-grained control over which portions of their content are shared.

There are a variety of user interface components already in use by websites that can be used to provide this functionality. The scope of the invention is not limited in any way by the style or arrangement of the elements of the web site user interface.

[002 Description of Higher-Order Indexing Module]

The function of the indexing module is to examine data files and create an index of those data files by topic. The topic should be an accurate classification of the contents of the data file within the range of a pre-existing set of topic categories. There are several methods for examining the data that is to be written to the disk. In one embodiment of the indexing software, files are examined for data in the form of plain text, and then that text is extracted and used to determine a topic using algorithms from the data mining field.

One such state-of-the-art classification method is implemented, which receives additional input from the system's user interface. Upon installation of the system, the system scans the data files that the user wishes to share, randomly selects a sample of the files, and prompts the user to input the correct topic of those files. This sample of user-labeled data is referred to in the field of statistical machine learning as the "training set." An algorithm known as the "training algorithm" uses the user-labeled data as its training set, and generates a second algorithm, called the "classification rule", for automatically classifying data that will be written to the disk in the future. The combination of training algorithm and classification rule make up our classification method. Typically they are not referred to independently, but as one Statistical Machine Learning algorithm.

The classification method used for this invention falls in the realm of Statistical Machine Learning algorithms, yet includes key advancements in the field. Statistical machine learning algorithms operate on flat data and traditionally assume that instances are independent and identically distributed (IID). However, this context-free approach does not exploit the available information about relationships between instances in the dataset [4]. In link mining, a subset of the field of statistical relational learning, algorithms operate on relational data that includes explicit links between instances. These relations provide rich information that can be used to improve classification accuracy of learned models, since attributes of linked instances are often correlated, and links are more likely to exist between instances that have some commonality. Given a set of test instances, relational models simultaneously label all instances in order to exploit the correlations between class labels of related instances. This is also known as collective classification (or collective inference), and violates the traditional independence assumption. Several studies (e.g., [5], [6], [7]) have shown, however, that by making inferences about multiple data instances simultaneously, collective inference can significantly reduce classification error [9].

The base classification algorithm used by the invention is the well-known Naïve Bayes algorithm. Naïve Bayes is commonly used in text classification because it executes quickly [10]. The Naïve Bayes classifier is the simplest of Bayesian classifiers in that it assumes that all attributes of the examples are independent of each other given the context of the class. Although this assumption does not hold for most real-world datasets, overall Naïve Bayes performs fairly well. Traditional (or first-order) Naïve Bayes uses documents as instances and words as the attributes. This maps directly to the method of our invention, in that the data files written to the hard disk are the documents, and the textual contents of those files, consisting either of words or of character n-grams, are the attributes.

To use the Naïve Bayes algorithm with a set of documents, first an ordered set of attributes (words or n-grams) is selected (commonly the union of all words found in a corpus of documents.) The documents are then used to create a set of training vectors, one vector for each document. The length of the vectors is equal to the size of the set of entities used in the classification process, and each coordinate t of the vector is either 1 or 0 indicating whether that word is present in the document. To each vector is appended its class C, representing the true class label of this document.

The training process for Naïve Bayes is at heart a probabilistic calculation using the well-known Bayes' rule. Based on the training vectors, the following set of empirical probabilities can be calculated:

$$P(t|C) = (\text{\# of documents in class } C \text{ including word } t)/(\text{\# of documents in class } C) \quad (1)$$

$$P(C) = (\text{\# of documents in class } C)/(\text{total \# of documents}) \quad (2)$$

The training algorithm consists entirely of computing these quantities from the given vectors. After these probabilities are calculated, Bayes' rule gives us a rule for calculating the probability that any future encountered document d belongs to class C:

$$P(C|d) = P(d|C)P(C) \quad (3)$$

So to classify any future document, this probability is calculated for all classes, and the label of the class whose probability is highest is selected as the correct label.

The training algorithm for this invention has been modified to include the higher-order relational information described above, overcoming the independence assumption. In our system, the higher-order information used is in the form of a second-order co-occurrence path.

Explicit links described above can take the form of words or n-grams in common between documents. For example, if two documents share the same term, those two documents have a first-order link to each other. If two documents both have a first-order link to a third document, but not to each other, then that is a second-order link, and so on. The highest order of links to be used in the training process is fixed beforehand. The preferred embodiment of this invention uses a second-order model.

In the higher-order algorithm, the form of the training set used is identical to that of traditional Naïve Bayes. However, a different set of empirical probabilities is calculated, as follows:

$$P\_(t|C) = (\text{\# of higher-order paths in class } C \text{ including word } t)/(\text{\# of higher-order paths in class } C) \quad (4)$$

$$P(C) = (\text{\# of higher-order paths in class } C)/(\text{total \# of higher-order paths}) \quad (5)$$

The rest of the calculations and the inference process are the same as traditional (first-order) Naïve Bayes. Though the training algorithm considers higher-order information, after the training phase is complete the classification is still done with single data instances. In other words, after (4) and (5) are calculated from the training set, it is possible to compute (3) with a single document in order to perform the classification. This is a significant advantage as it allows data files to be classified one-by-one, in real time, as they are written to the hard disk.

Computing the higher-order statistics used for the training process requires enumeration of all the second-order co-occurrence paths. This can be done using methods of graph theory. Our definition of a higher-order path is akin to that found in graph theory, which states that given a non-empty graph $G=(V, E)$ of the form $V=\{x_0, x_1, \ldots, x_k\}$, $E=\{x_0x_1, x_1x_2, \ldots, x_{k-1}x_k\}$ with nodes $x_i$ distinct, two vertices $x_i$ and $x_k$ are linked by a path P where the number of edges in P is its length. Such a path is often referred to by the natural sequence of its vertices $x_0x_1 \ldots x_k$. [6]. Our definition differs from this in a couple of respects, however. First, vertices $V=\{e_0, e_1, \ldots, e_k\}$ represent entities, and edges $E=\{r_0, r_1, \ldots, r_m\}$ represents records, documents or instances. Several edges may exist between given entities. Finally and most importantly, in a higher-order path both vertices and edges must be distinct.

Co-occurrence relations in a record or instance set can be represented as an undirected graph G=(V, E) such that V is a finite set of vertices (i.e., entities) and E is the set of edges representing co-occurrence relations. In other words, if two entities co-occur in a record then there is an edge between the corresponding vertices and this edge is labeled with the records(s) in which they co-occur. It is not straightforward, however, to depict higher-order paths with conventional graph structures because multiple paths may connect two given entities: for example, $e_1$-$r_1$-$e_2$ and $e_1$-$r_2$-$e_2$ are both valid paths between entities $e_1$ and $e_2$. A conventional graph can nonetheless be modified to represent paths of this nature by maintaining a data structure that contains lists of records for each edge. We term this a path group. Path groups are extracted directly from the co-occurrence graph G. Using this representation, the higher-order paths correspond to a complete matching in the bipartite graph formed from the set of entities and the set of lists of records. Likewise, higher-order paths defined in this manner are the system of distinct representatives of the sets of records for each edge.

Figure 6:
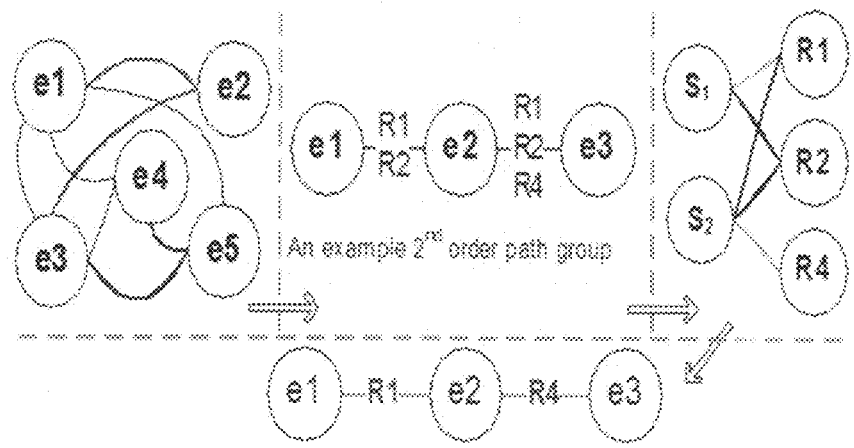
FIG. 6 is an embodiment of the process of extracting and enumerating higher-order paths from a co-occurrence graph.

Using the path group representation, we need to identify the systems of distinct representatives (SDRs) of the record sets. Each distinct representative in the path group satisfies the second requirement (i.e., edges must be unique) and corresponds to a higher order path. In order to enumerate all the distinct representatives in a given path group, a bipartite graph $G_b=(V_1 \cup V_2, E)$ is formed such that $V_1$ is the sets of records ($S_1, S_2, \ldots$) in a given path group and $V_2$ is the records themselves. A maximum matching with cardinality $|V_1|$ in this bipartite graph yields the SDR for the higher order path. This process is summarized in FIG. 6. In FIG. 6, we can see an example second-order path group ($e_1$-$\{1,2\}$-$e_2$-$\{1,2,4\}$-$e_3$) that is extracted from the co-occurrence graph $G_c$. This particular $2^{nd}$ order path group includes two sets of records: $S_1=\{1,2\}$ and $S_2=\{1,2,4\}$. $S_1$ corresponds to the records in which $e_1$ and $e_2$ co-occur, and $S_2$ is the set of records in which $e_2$ and $e_3$ co-occur. A bipartite graph $G_b=(V_1 \cup V_2, E)$ is formed where $V_1$ is the two sets of records and $V_2$ is the all records in these sets. Enumerating all maximum matchings in this graph yields all higher-order paths in the path group. The fourth diagram (depicted in FIG. 6) shows an example of one of the many paths in this path group. In this higher-order path, edge labels $R_1$ and $R_4$ are records in $S_1$ and $S_2$ and the path corresponds to the orange-colored maximum matching in the bipartite graph.

In lieu of enumerating all maximum matchings to find the SDRs, in prior work [16] we also developed the following closed-forms for enumerating second- and third-order paths in path groups based on the inclusion-exclusion [24] principle:

$$N_{-2}=|A| \, |B|-|A \cap B| \tag{10}$$

$$N_{-3}=|A| \, |B| \, |C|-(|A \cap B| \, |C|+|A \cap C| \, |B|+|B \cap C| \, |A|)+2|A \cap B \cap C| \tag{11}$$

$$\begin{aligned}N_{-4}=&|A| \, |B| \, |C| \, |D|-(|A \cap B| \, |C| \, |D|+|A \cap C| \, |B| \, |D|+\\&|A \cap D| \, |B| \, |C|+|B \cap C| \, |A| \, |D|+|B \cap D| \, |A| \, |C|+\\&|C \cap D| \, |A| \, |B|)+(|A \cap B| \, |C \cap D|+|A \cap C| \, |B \cap D|+\\&|A \cap D| \, |B \cap C|)+2(|A \cap B \cap C| \, |D|+|A \cap B \cap D| \, |C|+\\&|A \cap C \cap D| \, |B|+|B \cap C \cap D| \, |A|)-6(|A \cap B \cap C \cap D|)\end{aligned} \tag{12}$$

Here the letters A, B and C represent sets of records for each edge in a third-order path group (e.g., $e_1$-$\{2,3,4\}$-$e_2$-$\{1,3,5\}$-$e_3$-$\{2,3,5\}$-$e_4$, A=$\{2,3,4\}$, B=$\{1,3,5\}$, C=$\{2,3,5\}$). Although our application is not completely analogous to the enumeration of sets using the inclusion-exclusion principle, we were able to successfully develop these three closed-forms using inclusion-exclusion as a starting point. As a result, for orders higher than four we rely on our iterative approach to enumeration using bipartite graphs.

This approach, known as "Higher-order Naïve Bayes", has been shown to significantly improve the classification performance when the training set is small. Therefore this algorithm is ideal for producing an accurate topic-indexing system while keeping the amount of manual classification required by the user to a minimum.

The output of the categorization algorithm is an index that is partitioned into subsections called 'topic indexes', with one topic index containing all entries that correspond to a particular topic. As data is added to each topic index, a 'lift' metric is computed to measure the density and quality of data in the topic index. The data in the topic index facilitate the advanced searching and recommendation features of the system.

[003 Description of Cross-Training-Based Methods for Index Comparison and Merging]

Document classification is a well-established technology for assigning categories from an existing taxonomy to documents. However, there is currently no single universal set of categories that can be used to classify data, and we do not expect one to arise in the near future. Furthermore, much content is generated without regard to any taxonomy whatsoever. This is certainly the case for the user-generated topics generated by the invention.

Figure 7:
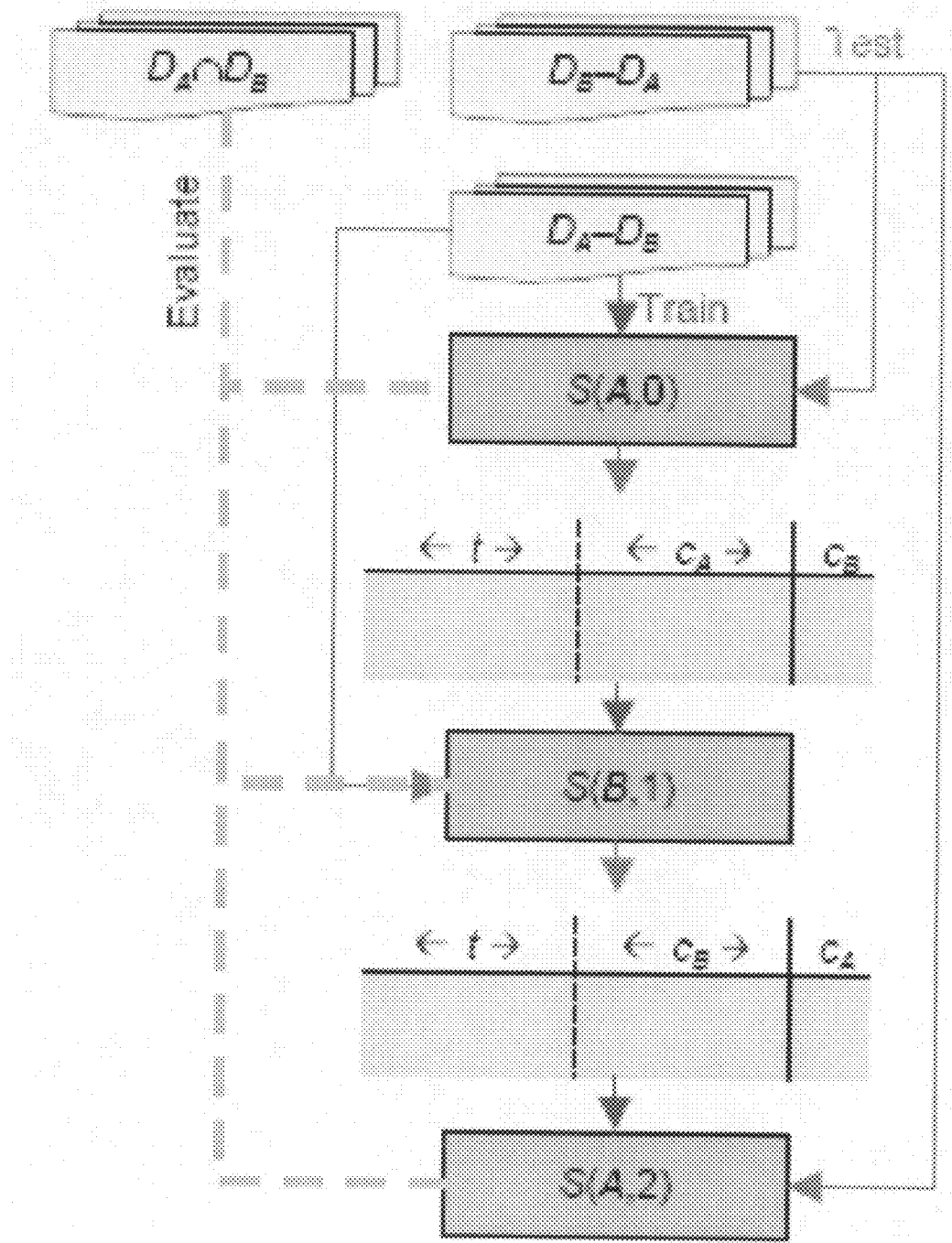
FIG. 7 is an embodiment of the machine learning procedure known as cross-training, described below.

However, it has been shown that a semi-supervised learning technique known as cross-training can discover and exploit probabilistic relations between two taxonomies for more accurate classification [23]. Sarawagi et al. [23] point out that "Cross-training is related to multi-task learning or life-long learning, in which information (features, models, etc.) from one learning task is used for another." The basic idea is to leverage the class label(s) from one training set as attributes which are used in training a classifier on a second training set. The predictions that result are then factored into the final model built on the first set. FIG. 7, which is drawn from Sarawagi et al. [23], depicts this scenario.

At first glance the approach seems similar to the co-training technique of Blum and Mitchell (1998) because both approaches involve a pair of learners. In co-training, however, the models are built from disjoint sets of attributes whereas in cross-training the models depend on a single shared dictionary of attributes. Essentially, cross-training is a paradigm in which two independent classifiers learn to classify each others' training sets. This results in increased performance of both classifiers as well as a way to measure the similarity of the classes that have been learned.

[004 Description of Peer-to-Peer Software and Protocol]

Peer-to-peer (P2P) technology refers to a system that manages distributed resources to perform data sharing functions in a decentralized manner. The invention contains a customized software implementation of a peer-to-peer protocol that serves to automatically share the contents of the hard disk on a network to which other instances of the invention (or compatible devices) are connected. The peer-to-peer software is also customized to share the index data generated by the indexing software component. Through the peer-to-peer software component, the invention acts as one node, or peer, on a large network of compatible devices.

The peer-to-peer component works by first registering the device on the network with a unique generated ID number. It contacts a server peer [28] and registers its ID with a username and password supplied by the user of the system. If the authentication process succeeds, the client will be able to continue by requesting the IDs of peers that are in the same peer group.

The peer-to-peer software performs authentication and access control by means of user groups. The groups in the peer-to-peer network form a hierarchical structure. At the lowest level, a group is created for each individual user who is registered in the system. This provides each user full search, read, and write access for his or her own data from any remote location. At the next level there are "user groups" which are created by users and can be joined by an arbitrary number of other users. Such groups may have open membership (anyone who desires may join), or invitation-only, by means of a digital certificate. A single user may be a member of any number of such groups. By default, these groups offer read-only data access to the members of the group. At the highest level there is the "world" group, consisting of all users of the system on any reachable network.

The underlying mechanics of the peer-to-peer protocol perform discovery and routing functions that allow any type of data to be distributed between peers on the network without recourse to a centralized server. The peer-to-peer software incorporates advanced techniques for providing access to networked resources which are located behind firewalls or Network Address Translation (NAT) routers.

The peer-to-peer software contains additional capabilities allowing the device to act as a "Server Peer" on the network. This added functionality is related to data transport, discovery and routing on the peer-to-peer network. Server peers increase the reliability flexibility, and self-healing properties of the peer-to-peer network. The server peer functionality may be optionally activated by the end user.

[005 Indexing to Peer-to-Peer Software Interface]

The peer-to-peer software component is integrated with the indexing component in a novel way. The most significant feature of the integration of the peer-to-peer software with indexing is index sharing. Topic indexes are shared transparently on the network, according to the demands of end-user applications and the permissions that users specify for their topic indexes. The permissions of each topic index can be set independently of the data itself and independently of other topic indexes. The user of the system can select which topic indexes of their own are shared with which groups. In this way the user chooses by topic which subsets of their data are shared, rather than by file location as is typical in file-sharing applications.

Furthermore, the peer-to-peer software is designed to treat index data that is transferred over the network differently from other types of data. Each of the "packets" (transmission units) of data transferred by the peer-to-peer protocol contain a predefined set of signature bytes that identify them as either index data or regular data. If a peer node that is used to transfer data between two other hosts sees index data in the packets it is transferring, and it has permission to read the index, it will add that index data to its own index even though the node is not the original destination for the index data. In this way the distributed index of the P2P group's data becomes more complete as the network is utilized.

The sharing of topic indexes provides an efficient peer search method, in which all resources shared by a group can be searched. When the user performs a search of a group to which he or she has search access, the indexes of that group are downloaded to the user transparently through the peer-to-peer network. This is much more efficient and robust than attempting to discover and search all shared data on the network, or than maintaining a centralized index.

Through the integration of indexing with peer-to-peer technology, the system automatically provides searching and recommendation of the shared data on the basis of content topics, which is a more advanced and intuitive method of sharing data. Searching is just one sample application that is provided by means of topic index sharing; the advanced social networking applications are described below.

[006 Integration of Web Site with P2P and Indexing Module]

The integration of the website interface with the peer-to-peer sharing and indexing system is achieved by means of the software module installed on the client device. The software contains code that interfaces with the web browser through one of the well-known browser extension methods (e.g., ActiveX™). This allows the web site to construct its interface using both data from the social network's web servers and data available through the peer-to-peer network.

For example, by means of the control, data that has been received through sharing may be displayed on the web interface, so that the data is presented through the website but is in fact immediately available on the client device.

OPERATION OF INVENTION

Preferred Embodiment

First, we describe the one-time process in which the user installs the software and begins to participate in the social network. The user goes to the web site and registers for the social networking service, providing details such as name, email address, preferred username and password. Integrated with the registration process is the download of the client-side indexing and peer-to-peer software. When online registration is complete, the client-side software installation begins automatically. During this installation process, the user selects which drives and folders should be searched for data to be indexed, as well as which index categories he or she wishes to use in classifying his or her data. After a brief scan of the drives, the user is asked to manually label the topic category of a small number of randomly selected data files from those to be indexed. This gives the topic classification functionality a high level of accuracy, using the sparse-data supervised learning algorithm described above.

After joining the social network, the next step in user operation is to join or create groups. A user can join more than one group, and within each group specifies his or her 'friends'. Within a group, the 'friends' have access to all topic indexes that are shared with that group.

Then, the user is ready to participate fully in the social network. From this point, the user will have a dynamic web page on the network that is automatically updated according to the user's current media-based interests, as indicated by the indexing software portion of the client software, which dynamically updates the index as new files are stored on the user's local devices. The client software also compares the user's topics to the topics of other users in the user's friend group using a similarity measure, and creates links between sufficiently similar topics, allowing the website to display updates to topic indexes of the user's friends.

Description and Operation of Alternative Embodiments

The client software is not limited to one particular platform, and can be run on any computing device with sufficient resources to run the indexing software and a web browser with dynamic content capabilities.

REFERENCES

[1] B. Taskar, P. Abbeel, D. Koller, Discriminative Probabilistic Models for Relational Data, In Proceedings of Uncertainty in Artificial Intelligence conference UAI02, Edmonton, Canada, 2002

[2] L. Getoor and C. P. Diehl, Link Mining: A Survey. SIGKDD Explorations, 7(2), 2005, 3-12

[3] S. A. Macskassy and F. Provost, A brief survey of machine learning methods for classification in networked data and application to suspicion scoring, Workshop on Statistical Network Analysis at 23rd International Conference on Machine Learning, Pittsburgh, Pa., 2006

[4] R. Angelova and G. Weikum, Graph-based Text Classification: Learn From Your Neighbors, SIGIR'06, August, 2006, Seattle, USA

[5] S. Chakrabarti, B. Dom, P. Indyk, Enhanced Hypertext Classification Using Hyper-Links, In Proceedings of ACM SIGMOD Conference, 1998, pp. 307-318

[6] J. Neville and D. Jensen, Iterative Classification in Relational Data. In Proc. AAAI-2000 Workshop on Learning Statistical Models from Relational Data, 2000, pp. 13-20

[7] B. Taskar, E. Segal, D. Koller, Probabilistic Classification and Clustering in Relational Data. In Proc. 17th International Joint Conference on Artificial Intelligence, 2001, pp. 870-878, 2001.

[8] Q. Lu, and L. Getoor, Link-based Classification. Proceedings of the Twentieth international conference on machine learning (ICML-2003), Washington D.C., 2003

[9] J. Neville and D. Jensen, Dependency Networks for Relational Data, Proceedings of the Fourth IEEE International Conference on Data Mining (ICDM'04), November 2004, pp. 170-177, Brighton, UK

[10] J. D. M. Rennie, L. Shih, J. Teevan, D. R. Karger, Tackling the poor assumptions of naive bayes text classifiers, In Proceedings of the Twentieth International Conference on Machine Learning, 2003.

[11] A. K. McCallum and K. Nigam. A comparison of event models for naive bayes text classification. In Working Notes of the ICML AAAI Workshop on Learning for Text Categorization, 1998

[12] S. Eyheramendy, D. D. Lewis, D. Madigan, On the naive Bayes model for text categorization. In Proceedings of AISTATS 2003, 9th International Workshop on Artificial Intelligence and Statistics, 2003

[13] S. Chakrabarti. Mining the Web: Discovering Knowledge from Hypertext Data. Morgan Kaufmann, 2002.

[14] A. Kontostathis, and W. M. Pottenger, A Framework for Understanding LSI Performance. Information Processing & Management, 42(1), 2006, pp. 56-73.

[15] S. Deerwester, S. T. Dumais, G. W. Furnas, T. K. Landauer, R. Harshman, Indexing by latent semantic analysis. Journal of the American Society for Information Science, vol. 41, no. 6, 1990, pp. 391-407.

[16] M. Ganiz, W. M. Pottenger, X. Yang, Link Analysis of Higher-Order Paths in Supervised Learning Datasets, In the Proceedings of the Workshop on Link Analysis, Counterterrorism and Security, 2006 SIAM Conference on Data Mining, Bethesda, Md., April 2006

[17] M. Ganiz, W. M. Pottenger, S. Kanitkar, M. C. Chuah, Detection of Interdomain Routing Anomalies Based on Higher-Order Path Analysis. Proceedings of the Sixth IEEE International Conference on Data Mining (ICDM'06), December 2006, Hong Kong, China

[18] P. Edmonds, Choosing the word most typical in context using a lexical co-occurrence network. In Proceedings of the Thirty-fifth Annual Meeting of the Association for Computational Linguistics, 1997, pp. 507-509.

[19] X. Zhang, M. Berry, P. Raghavan, Level search schemes for information filtering and retrieval. Information Processing and Management 37 (2), 2000, pp. 313-334.

[20] H. Schütze, Automatic Word Sense Discrimination. Computational Linguistics 24 (1), 1998, pp. 97-124.

[21] J. Xu, W. B. Croft, Corpus-Based Stemming Using Co-Occurrence of Word Variants. ACM Transactions on Information Systems, 16 (1), 1998, pp. 61-81.

[22] T. Uno, An Output Linear Time Algorithm for Enumerating Chordless Cycles, 92nd SIGAL of Information Processing Society Japan, 2003, pp. 47-53

[23] T. Uno, Algorithms for Enumerating All Perfect, Maximum and Maximal Matchings in Bipartite Graphs. Lecture Notes in Computer Science, Vol. 1350. Proceedings of the 8th International Symposium on Algorithms and Computation, 1997, pp. 92-101, ISBN: 3-540-63890-3, Springer-Verlag, London, UK

[24] J. H. Van Lint, and R. M. Wilson. A Course in Combinatorics. Cambridge University Press, 1993, ISBN: 0-521-42260-4

[25] A. McCallum, K. Nigam, J. Rennie, K. Seymore, Automating the construction of internet portals with machine learning. Information Retrieval, 3, 2000, pp. 127-163.

[26] C. L. Giles, K. Bollacker, S. Lawrence, CiteSeer: An automatic citation indexing system, ACM Digital Libraries 98, 1998

[27] P. Sen, and L. Getoor, Link-based Classification. University of Maryland Technical Report, Number CS-TR-4858, February 2007

[28] Intuidex Inc., "Peer-to-Peer Indexing-Based Marketplace", provisional patent 61/008,405 filed Dec. 20, 2007.

[29] Intuidex Inc., "System for Content-Based Peer-to-Peer Indexing of Data on a Networked Storage Device", provisional patent 61/008,404 filed Dec. 20, 2007.

[30] Intuidex Inc., "Social Networking on a Website with Topic-Based Data Sharing", provisional patent 61/008,399 filed Dec. 20, 2007.

What is claimed is:

1. A system comprising:
a computing device comprising a processor, the computing device accessing a social networking website and communicating over a peer-to-peer network with other computing devices, the computing device comprising:
 (a) a higher-order indexing module executing on the computing device and configured to:
  generate a plurality of topic indexes to a pre-selected data set, and compute similarity of said topic indexes,
  wherein the higher-order indexing module calculates probabilities:

$$P\_(t|C) = (\text{\# of higher-order paths in class } C \text{ comprising entity } t)/(\text{\# of higher-order paths in class } C)$$

and $$P(C) = (\text{\# of higher-order paths in class } C)/(\text{total \# of higher-order paths});$$

and
 (b) a user- and group-based authentication and membership module allowing users to sign in, join groups, and specify sharing of said topic indexes on said social networking website via said peer-to-peer network by specifying individual and group permissions for said topic indexes;
   wherein said topic indexes are shared between the computing device and the other computing devices over said peer-to-peer network.

2. The system of claim 1, wherein each topic index comprises a plurality of key elements, a plurality of entry items that link the key elements to original source data, and a topic classifier for data.

3. The system of claim 2, wherein a user can access the original source data via links in the topic indexes.

4. The system of claim 2, wherein the higher-order indexing module is further configured to obtain a training set of data.

5. The system of claim 4, wherein the higher-order indexing module is further configured to generate a classification rule for classifying data that will be stored.

6. The system of claim 5, wherein the classification rule is based on relationships between instances in the pre-selected data set.

7. The system of claim 6, wherein the classification rule comprises an algorithm using entities and instances.

8. The system of claim 7, wherein the higher-order indexing module further calculates a probability that a vector d belongs to class C using:

$$P(C|d)=P(d|C)P(C).$$

9. The system of claim 1, further comprising an upload module for uploading said topic indexes to said social networking website using a network protocol.

10. The system of claim 1, wherein the topic indexes are based on a pre-existing set of topic, categories.

11. A method for sharing data on a social network, comprising:
   (a) registering, by a computing device, a user using a user computer on a social network via a social networking website;
   (b) receiving, by the computing device from the user computer, a selection of friends on said social network;
   (c) transmitting a client module to the user computer, the client module comprising:
      (1) a higher-order indexing module configured to:
         generate a plurality of topic indexes to a pre-selected data set, and compute similarity of said topic indexes,
         wherein the higher-order indexing module calculates probabilities:

$P\_(t|C)$=(# of higher-order paths in class $C$ comprising entity $t$)/(# of higher-order paths in class $C$)

and $P(C)$=(# of higher-order paths in class $C$)/(total # of higher-order paths); and (2) a user- and group-based authentication and membership module allowing users to sign in, join groups, and specify sharing of said topic indexes on said social network by specifying individual and group permissions for said topic indexes;
         wherein said topic indexes are shared between user computer and other computing devices over said social network;
   (d) receiving, by the computing device from the user computer, a plurality of said topic indexes for sharing with said friends on said social network;
   (e) sharing, by the computing device, said plurality of topic indexes with said friends; and
   (f) computing, by the computing device, a plurality of similarity measures between said topic indexes and friend topic indexes.

12. The method of claim 11, further comprising receiving, by the computing device from the user computer, registration information for registration of the user with the social networking website.

13. The method of claim 11, further comprising generating, by the computing device, a link between certain of said topic indexes and said friend topic indexes for which a corresponding similarity measure is above a pre-determined threshold.

14. The method of claim 13, further comprising searching, by the computing device, for data in said linked friend topic indexes.

15. The method of claim 14, further comprising receiving periodically a plurality of updates to said linked friend topic indexes.

16. The method of claim 15, further comprising displaying said plurality of updates to said linked friend topic indexes by said social networking website.

17. The method of claim 11, wherein the higher-order indexing module classifies data received by said higher order indexing module into a topic index in said topic indexes based on relationships between the information in the pre-selected data set.

18. The method of claim 11, wherein the higher-order indexing module defines higher-order paths using a non-empty graph G=(V,E) of the form V={$x_0, x_1, \ldots, x_k$}, E={($x_0, x_1$), ($x_1, x_2$), \ldots, ($x_{k-1} x_k$)} with nodes $x_i$ distinct, two vertices $x_i$ and $x_k$ linked by path P where the number of edges in P is its length, where vertices V={$e_0, e_1, \ldots, e_k$} represent entities, and edges E={$r_0, r_1, \ldots, r_m$} represent records, documents, vectors, or instances, and wherein both vertices and edges are distinct.

19. The method of claim 18 wherein the indexing of said data set using the higher-order indexing module further comprises calculating a probability that a vector d belongs to class C using:

$$P(C|d)=P(d|C)P(C).$$

20. The method of claim 11, further comprising enabling access to original source data via links in the topic indexes.

* * * * *